United States Patent [19]

Reppich et al.

[11] Patent Number: 5,320,076
[45] Date of Patent: Jun. 14, 1994

[54] ARRANGEMENT FOR DETECTING THE POSITION OF AN ACCELERATOR PEDAL AND/OR A POWER-DETERMINING ELEMENT OF THE INTERNAL COMBUSTION ENGINE OF A MOTOR VEHICLE

[75] Inventors: Andreas Reppich, Leonberg; Frank Bederna, Markröningen; Werner Huber, Schwaikheim; Rainer Norgauer, Stuttgart, all of Fed. Rep. of Germany

[73] Assignee: Robert Bosch GmbH, Stuttgart, Fed. Rep. of Germany

[21] Appl. No.: 144,010

[22] Filed: Nov. 1, 1993

Related U.S. Application Data

[63] Continuation of Ser. No. 959,721, Oct. 13, 1992, abandoned.

[30] Foreign Application Priority Data

Oct. 10, 1991 [DE] Fed. Rep. of Germany ....... 4133571

[51] Int. Cl.$^5$ ............................................. F02D 7/00
[52] U.S. Cl. .................................. 123/399; 364/431.05
[58] Field of Search ..................... 123/399, 396; 364/431.05

[56] References Cited

U.S. PATENT DOCUMENTS

| | | | |
|---|---|---|---|
| 4,603,675 | 8/1986 | Junginger et al. | 123/478 |
| 4,920,939 | 5/1990 | Gale | 123/478 |
| 5,191,531 | 3/1993 | Kurosu et al. | 364/431.05 |
| 5,201,291 | 4/1993 | Katoh et al. | 123/399 |
| 5,233,958 | 8/1993 | Knoss et al. | 123/396 |
| 5,255,653 | 10/1993 | Ironside et al. | 123/399 |

FOREIGN PATENT DOCUMENTS

| | | | |
|---|---|---|---|
| 3539407 | 5/1987 | Fed. Rep. of Germany | 123/478 |
| 3631200 | 3/1988 | Fed. Rep. of Germany | 123/478 |
| 3812760 | 10/1989 | Fed. Rep. of Germany | 123/478 |
| 4036330 | 8/1991 | Fed. Rep. of Germany | 123/478 |

Primary Examiner—Raymond A. Nelli
Attorney, Agent, or Firm—Walter Ottesen

[57] ABSTRACT

The invention is directed to an arrangement for detecting the position of an accelerator pedal and/or a power-determining element of an internal combustion engine of a motor vehicle. The arrangement has at least two measuring devices as well as monitoring means which check the function of these measuring devices on the basis of the measuring signals thereof. In addition, a further measuring device in the form of a switch element is provided which likewise generates a signal representative of the position of an accelerator pedal and/or power-determining element of an internal combustion engine of a motor vehicle. A microcomputer selects on the basis of all three measuring signals at least one of the measuring signals for controlling the drive power of the engine in a motor vehicle. The switching element is a Hall switch.

11 Claims, 3 Drawing Sheets

ARRANGEMENT FOR DETECTING THE POSITION OF AN ACCELERATOR PEDAL AND/OR A POWER-DETERMINING ELEMENT OF THE INTERNAL COMBUSTION ENGINE OF A MOTOR VEHICLE

This is a continuation of application Ser. No. 07/959,721, filed Oct. 13, 1992 now abandoned.

BACKGROUND OF THE INVENTION

For reasons of operational safety and availability of motor vehicles, components critical to safety and whose function is absolutely necessary for the operation of the vehicle are increasingly provided in a redundant configuration. This applies especially to devices for detecting the position of an accelerator pedal and/or a power-determining element of the engine or of the motor vehicle.

Published German patent application 3,539,407 discloses providing two of each of the following: a measuring device for detecting the position of a power-determining element, a desired-value transducer, an engine-speed transducer and the transducer detecting the position of the brake pedal.

U.S. Pat. No. 4,603,675 discloses an electronic accelerator-pedal system for a motor vehicle wherein the measuring device for detecting the position of an operator-actuated element are provided in a twin configuration. Here, either two potentiometers detecting the position or a potentiometer-switch combination is provided. A fault condition in the area of the accelerator pedal, the measuring devices and/or their connecting lines to the control system can be determined by means of a comparison of the signal values generated by the twin measuring devices to a pregiven tolerance band. A fault condition is recognized when the signal values do not lie within this tolerance band. The system then transfers to an emergency-operating mode when a fault is detected.

When a fault condition is detected, an emergency operation limiting the use of the motor vehicle is introduced because in such devices safety considerations are of primary importance. This limited availability is however a serious disadvantage of the known systems.

SUMMARY OF THE INVENTION

It is an object of the invention to provide arrangements for detecting the position of an accelerator pedal and/or a power-determining element of an internal combustion engine of a motor vehicle and to configure the control systems of these motor vehicles in such a manner that the availability of the motor vehicle is ensured without limitation with respect to operational safety even in the presence of a fault condition.

This is achieved in that at least one further measuring device, a switching element, is present which generates a further signal representing the position of an accelerator and/or a power-determining element of an internal combustion engine of a motor vehicle. In addition, a microcomputer is provided which select at least one of these signals for evaluating the control of the motor vehicle on the basis of the measuring signal and the additional signal.

A position transducer having a multiple potentiometer is disclosed in German patent application 4,036,330.

With the measures provided by the invention, the availability of the motor vehicle is ensured without endangering the operational safety even when a measuring device or its connecting lines becomes defective.

An especially simple embodiment of the invention is defined by a switch actuating at a pregiven operating point as an additional measuring device. The defective measuring device or the connecting lines are isolated by means of a plausibility check of all three signals with great probability.

This procedure leads to an advantageous result, namely, that the normal function of the control system can be carried out in dependence upon one or two of the other elements when the defective element is switched out.

The application of the procedure provided by the invention in the case of position transducers for the accelerator pedal and/or power-determining elements in electronic gas-pedal systems for motor vehicles is especially advantageous.

A further increase in the availability of the motor vehicle can be achieved by providing the third measuring device in a technology deviating from the two other devices or by means of a configuration of the three measuring devices in different technologies.

It is advantageous when the signal of the third position transducer is generated without contact. It is especially advantageous to integrate a switch based on the Hall principle into the housing of the two other measuring devices.

Advantageous results are provided by the procedure of the invention in connection with twin potentiometers defining a position transducer.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
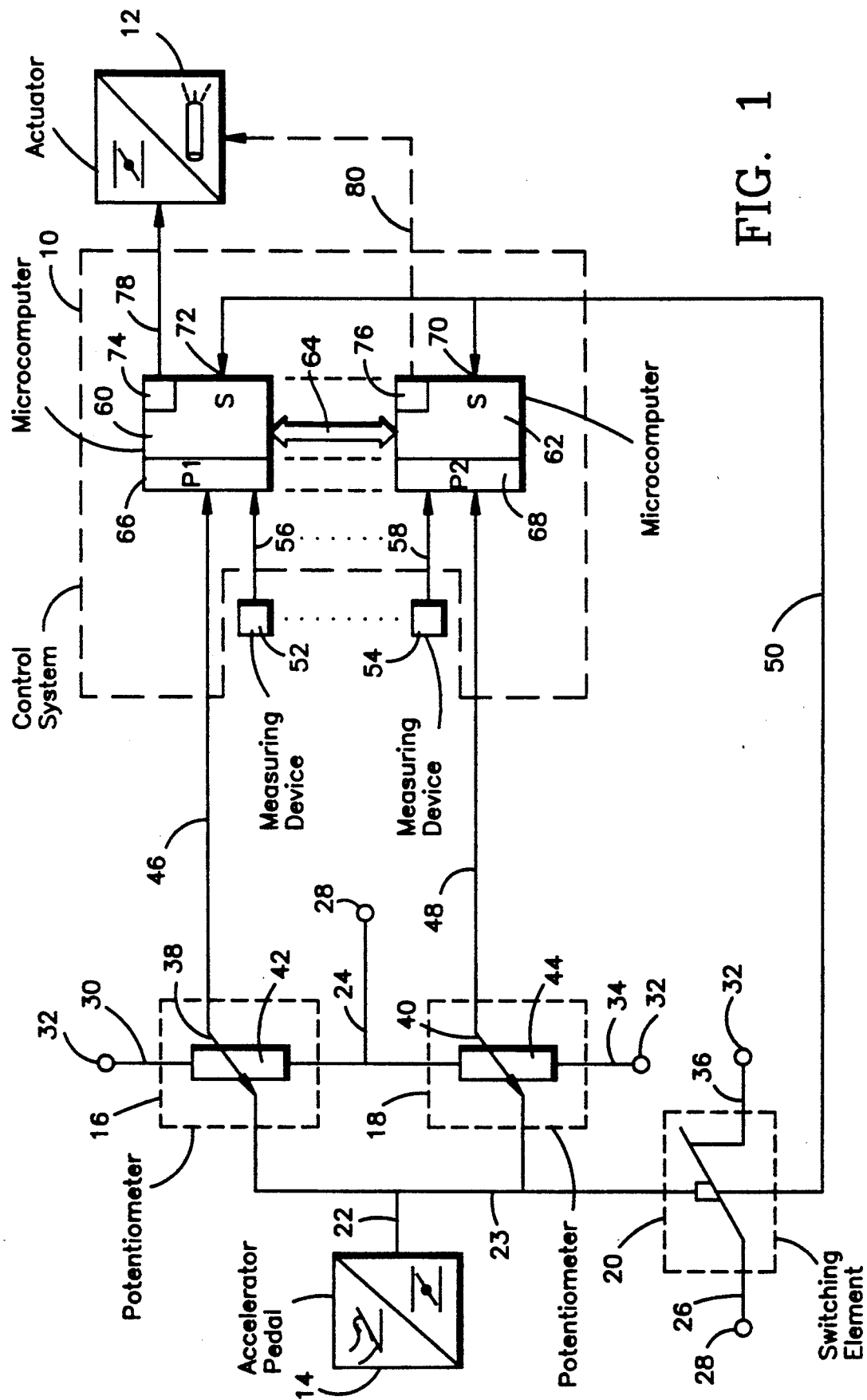
FIG. 1 shows a block diagram of an embodiment of the arrangement of the invention for detecting the position of an accelerator pedal and/or a power-determining element of an internal combustion engine of a motor vehicle.

The block diagram of FIG. 1 shows an electronic gas-pedal system wherein reference numeral 10 identifies a control system. The electronic gas-pedal system further includes an actuator 12 which is connected to a power-determining element of the motor vehicle such as a throttle flap or injection pump as well as a further element 14 which represents an operator-actuated element in the form of an accelerator pedal. In another embodiment, element 14 can be the power-determining element or the actuator 12 itself. In addition, the procedure described below is also advantageous with respect to an operator-actuated element as well as to a power-determining element.

Two position transducers 16 and 18 as well as an additional measuring device 20 and a switching element are also provided. The element 14 is connected via mechanical connections (22, 23) to movable parts of the measuring devices 16 to 20. The signal values generated by the devices 16 and 18 are transmitted to the control system 10 via connecting lines 46 and 48, respectively. The switching state of the additional measuring device 20 is emitted to the control system 10 via the connecting line 50. In addition, measuring devices 52 to 54 are provided which transmit operating variables of the drive motor and/or motor vehicle to the control system 10 via the lines 56 to 58, respectively.

Measuring devices 16 and 18 are preferably two redundant position transducers and can especially be potentiometers as shown in FIG. 1 or they can be contactless measuring devices such as inductive sensors, capacitive sensors and/or sensors operating pursuant to the eddy-current principle. The measuring device 20 is configured pursuant to another technology compared to the measuring devices 16 and 18 and defines especially a contactless switching element which has one or more switching points. Furthermore, the measuring devices 16 and 18 can be only partially redundant with respect to each other in a pregiven position range in one embodiment; that is, the measuring ranges of the two measuring devices overlap only in a part of the overall range.

In addition, the measuring device 16 can be a contactless sensor and the measuring device 18 can be a potentiometer or vice versa.

In the case of the potentiometers shown, the measuring devices 16 and 18 are connected via connecting lines 24 and the measuring device 20 is connected via line 26 to the positive pole 28 of a supply voltage. The connecting line 30 connects the measuring device 16 to the negative pole 32 of the voltage supply whereas, for the measuring device 18, this connection is defined by a line 34 and for the measuring device 20 by the line 36. In the embodiment shown in FIG. 1, the mechanical connection 23 is connected to the sliders 38 and 40 of potentiometers 16 and 18, respectively, as well as to the movable element of the measuring device 20. The sliders 38 and 40 move over respective resistance tracks 42 and 44, respectively. The signal lines 46 and 48 are connected to the sliders 38 and 40, respectively.

In a preferred embodiment of the invention, the control system 10 includes two microcontrollers or computer elements 60 and 62 which are connected to each other via a bus system 64 for communication purposes. In other embodiments, it can, however, be adequate to use only one microcontroller.

The microcontrollers 60 and 62 include input areas 66 and 68 in which the signals supplied by measuring devices 16 and 18, respectively, are converted into digital values. The signals supplied by measuring devices 52 to 54 are also supplied to the input areas 66 and 68 where they too are converted into digital values. The signal line 50 is connected to the inputs 70 and 72 of the microcontrollers 62 and 60, respectively. Output lines 78 and 80 are connected to the output areas 74 and 76 of the microcontrollers 60 and 62, respectively. These output lines 78 and 80 connect the control system 10 to the actuator device 12. In a preferred embodiment, the actuator device can be driven via the line 78 exclusively whereas, in another embodiment, a common drive from the two microcontrollers can be provided via the lines 78 and 80.

The control system 10 forms, in dependence upon the input signals, a drive signal for the actuator device 12 for adjusting the power-determining element. The adjustment takes place in the sense of a control of the power generated by the engine of the motor vehicle in accordance with the driver's request detected via the accelerator pedal.

If the element 14 defines the accelerator pedal, then the position of the accelerator pedal is detected in dependence upon one of the signal values of the measuring devices 16 (P1) or 18 (P2) or in dependence upon the mean value of both signals. The measuring signals supplied via the lines 56 to 58 represent the road speed, engine temperature, wheel speed, position of the power-determining element, brake actuation, etcetera. A drive signal for the actuator device 12 is formed in the sense of a control of the position of the power-determining element to a desired value defined by the measuring signal values supplied. This procedure is known to persons working in the state of the art.

By comparing the signal values generated by the measuring devices 16 and 18 with each other in the sense of a plausibility check to a pregiven value tolerance range, the measuring devices 16 and 18 as well as their connecting lines (mechanical connections 22, 23, current supply connections 24, 30, 34, signal lines 46 and 48) are checked. A fault is detected when both signal values no longer lie in this tolerance range when compared to each other. With mutually opposing characteristics of the potentiometers, monitoring takes place by adding the signal values and comparing them to a pregiven tolerance band (P1+P2<tolerance range) or, for characteristics running in the same direction, monitoring takes place by checking the magnitude of the difference (P1-P2<tolerance range).

In addition, plausibility checks of both signal values are carried out individually with the position of the switching element 20 whereupon it can be concluded whether the measuring device 16, 18 or 20 is defective when the signal values of the measuring devices 16 and/or 18 are unplausible. This check is based upon that for a measured value of the measuring device 16 or 18, the switching element must have a pregiven signal or switching state.

The function of the control system 10 is then carried out in dependence upon the signals plausible to each other.

Only when all signal values are unplausible, the initiation of an emergency operation with power limitation is provided, for example, by limiting the maximum position of the power-determining element.

An embodiment with a position transducer is described above. Similar measures can be applied to engine speed transducers, pressure transducers etcetera. In addition, the procedure provided by the invention is not limited to the application to an internal combustion engine; instead, the procedures provided by the invention are also advantageous in combination with alternative motor vehicle drives such as electric motors.

Figure 2:
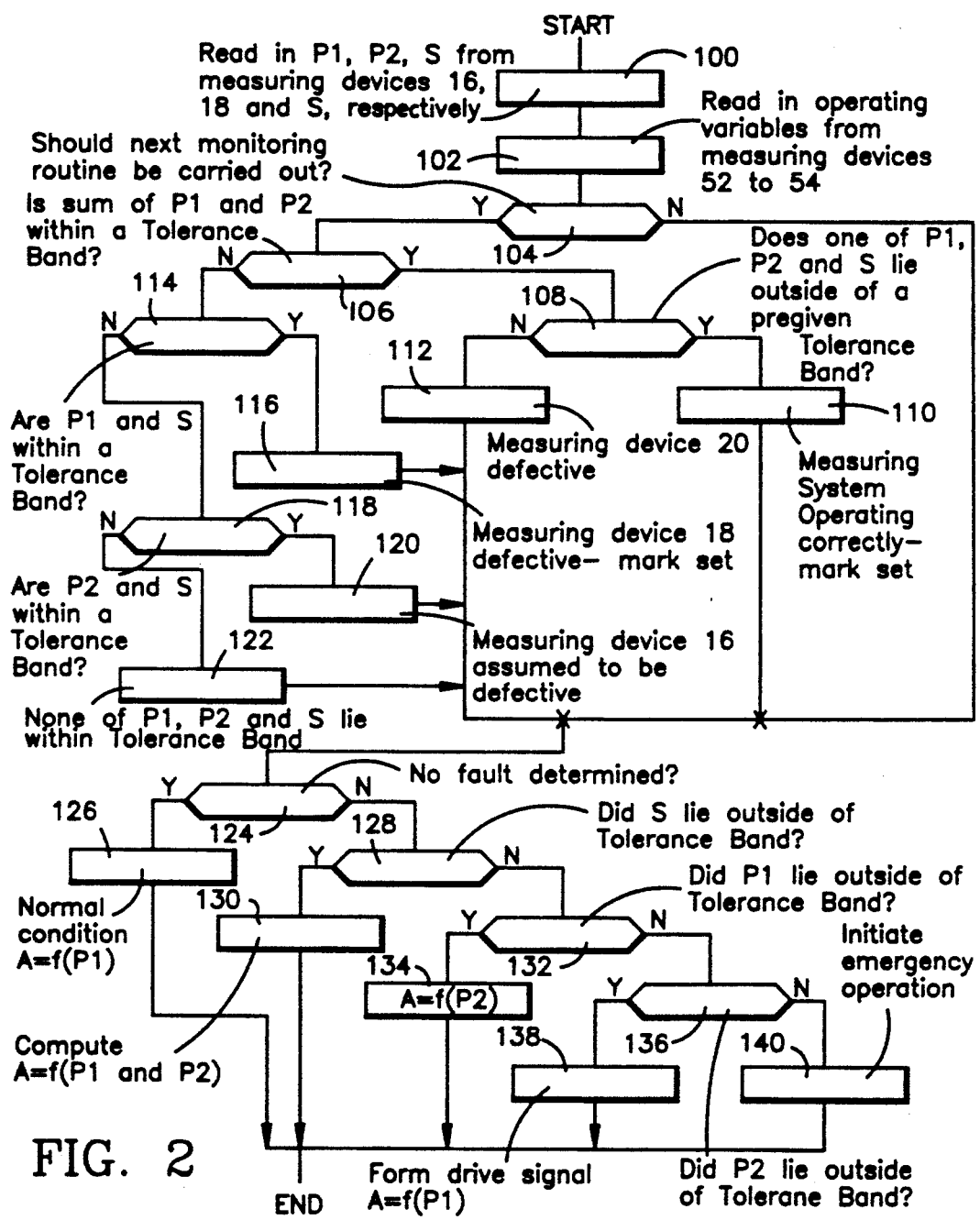
FIG. 2 is a flowchart showing an exemplary realization of the evaluation steps in the form of a computer program for carrying out the invention.

FIG. 2 shows a flowchart for carrying out the evaluation of three measuring signals for fault detection and control of the drive power. After start of the subprogram, the signal values of the measuring devices 16 (P1), 18 (P2) and 20 (S) are read in in the first step 100 and, in the next step 102, the additional operating variables detected by the measuring devices 52 to 54 are read in. In inquiry step 104, a check is made with a simultaneously running counter as to whether the next monitoring routine should be carried out. This monitoring routine is carried out at pregiven time points after several program pass-throughs.

Monitoring is initiated in step 106 wherein a check is made as to whether the signal values of the measuring devices 16 and 18 (P1 and P2) are plausible with respect to each other. In the present embodiment, this is obtained by the addition of the signal values and comparison of the sum to the pregiven tolerance band. If the sum is within the tolerance band, then the signal values will be recognized as plausible to each other and a check is made in step 108 as to whether at least one of the two signal values (P1 or P2) is plausible with the switching signal S of the additional measuring device 20. For a single switching function, which subdivides the value range of the measuring devices 16 and 18 into two measuring ranges, this inquiry is undertaken in such a manner that for pregiven measuring signal values P1 or P2, the correct switching state or switching condition of the measuring device 20 (high or low signal level) is checked. If this is the case, then in step 110, the measuring system is detected as operating correctly and a corresponding mark is set. Otherwise, in step 112, the statement is made that the signal of the additional measuring device is unplausible; that is, the additional measuring device 20 is defective with great probability. Thereafter, monitoring is ended.

In one embodiment, the switching element switches the signal on the line 50 in the region of idle position of the accelerator pedal from the low to the high signal level. In the idle region, the signal state S must therefore have a low level whereas a high signal level must be present outside of this range.

For the case that in inquiry step 106 the two signal values of measuring units 16 and 18 are not plausible relative to each other, the measured value of the measuring device 16 (P1) and the switching state S of the measuring device 20 are checked first with respect to each other as to plausibility in inquiry step 114 as described with reference to inquiry step 108. If P1 and S are plausible relative to each other, then, while considering the results of inquiry step 106, in step 116, a determination is made that the signal value of the measuring device 18 (P2) is unplausible and therefore the assumption can be made that a defect condition of this measuring device is present with great probability. A corresponding mark can then be set. This mark is set with the background that for plausibility between P1 and S and unplausibility between P1 and P2, a fault must perforce be present in connection with the signal P2.

If no plausibility between the values P1 and S is determined in inquiry step 114, then a check is made in inquiry step 118 as to whether a plausibility exists between the signals P2 and S. If this is the case, then, while considering in step 120 what occurred previously, the signal value P1 is recognized as unplausible and the assumption is made of a fault of measuring device 16. In the opposite case, a determination is made in step 122 that no plausibility can be determined among the three signals.

Monitoring is ended after each of the steps 110, 112, 116, 120 or 122.

After terminating monitoring or during a program run-through without monitoring, a subprogram is initiated starting with step 124 for determining the drive signal magnitude A for the actuator 12.

In inquiry step 124, a check is made as to whether the preceding monitoring has brought the result that "no fault in the region of the measuring devices can be determined" (step 110). If this is the case, a normal condition is presumed in accordance with step 126 and the drive signal A is formed on the basis of the signal value P1 of the measuring device 16. The computation of the drive signal magnitude A takes place on the basis of a desired value formed from the accelerator pedal position and other operating variables and on the basis of the actual value representing the position of the actuator while applying a known control equation with proportional, integral and/or differential response.

If in step 124, it is determined that the result of the preceding monitoring yielded no complete matching of the three signals, then a check is made in inquiry step 128 as to whether the result was a detected unplausibility of the switch (step 112). If this is the case, then in step 130, the drive signal A is computed on the basis of both signal values of the measuring devices 16 and 18, that is, the mean value or minimum value of both signals. If the result of the previous monitoring was that no unplausibility of the switch was detected, then in step 132 a check is made as to whether the measured value P1 was determined as unplausible (step 120). If this is the case, then, according to step 134, the drive signal is determined on the basis of the value P2 of the measuring device 18. If the measuring value P1 is not unplausible, then in step 136, a check is made as to whether the result of the monitoring was a detected unplausibility of the signal P2 (step 140). If this is the case, then, according to step 138, the drive signal is formed on the basis of the signal value P1 of the measuring device 16; whereas, in the opposite case, the result of the monitoring was "no plausibility" so that according to step 140, an emergency operation must be initiated while limiting the availability of the vehicle.

Thereafter, the subprogram is repeated which has the separated regions of monitoring and evaluation of the monitoring result.

In summary, it can be concluded that except for the case of "no plausibility", the availability of the system is ensured by switchover to signal values assumed to be correct. An incorrect plausibility result (which can be caused for potentiometers, for example, by locally increased contact resistances) has no effect on the operating performance of the system since no limiting emergency operation must be initiated. In addition, it is advantageous that in the subsequent monitoring such a fault can be corrected and the complete operability of the system can be reestablished.

Figure 3:
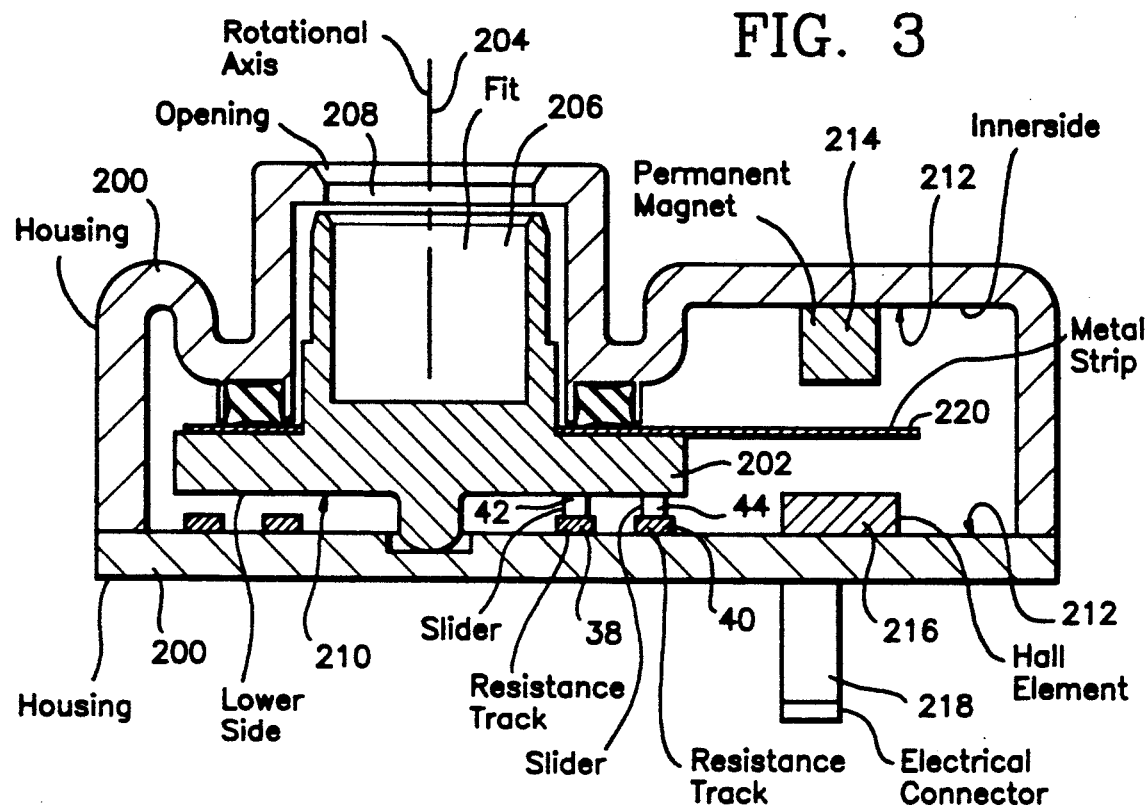
FIG. 3 is a schematic of an embodiment of an additional measuring device.
Figure 4:
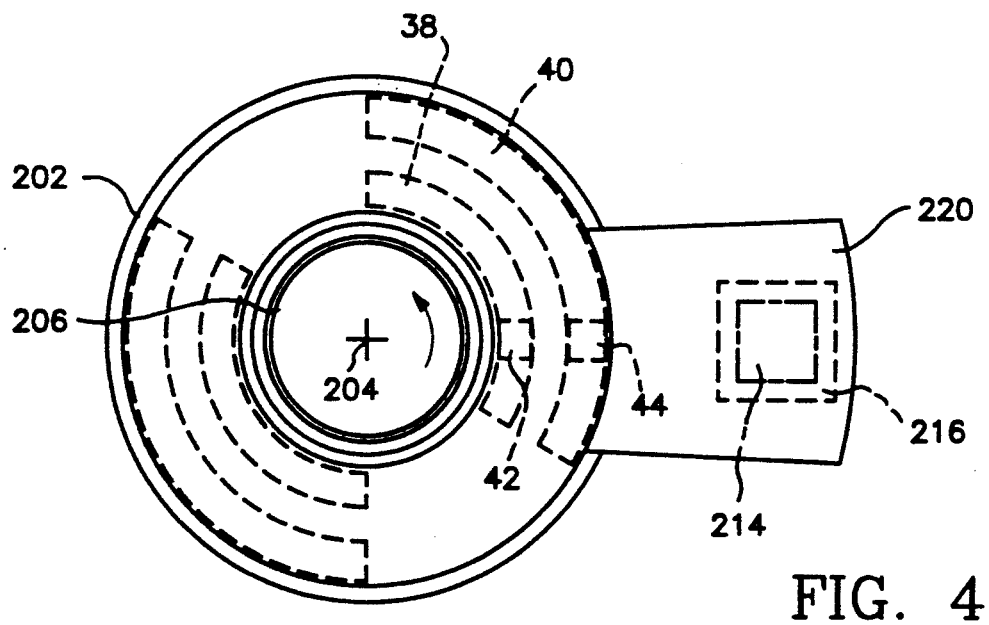
FIG. 4 shows a plan view of the measuring device of FIG. 3 including the essential elements.

FIGS. 3 and 4 show an advantageous embodiment of an additional measuring device 20. This measuring device is configured as a contactless switch which is integrated into the housing of the measuring devices 16 and 18 or comparable arrangements. The housing of the measuring devices 16 and 18 is known from German patent application 4,036,330.

The housing of measuring devices 16 and 18 includes a fixed part 200 as well as a movable part 202 which is configured so as to be rotatable about rotational axis 204.

The rotational part is rigidly connected to the power-determining element or to the operating element actuable by the driver with the shaft projecting into the opening 208 of the rigid housing part 200 and being firmly anchored against rotation in the fit 206 of the movable part 202. The shaft transmits the movement of the power-determining element or of the operator-actuated element.

In FIG. 3, the sliders 42 and 44 of the potentiometer shown in FIG. 1 are included as an example and are mounted on the lower side 210 of the movable part 202. These sliders 42 and 44 are in contact with the resistance tracks 38 and 40, respectively, mounted on the opposite lying side of the fixed housing part 200. The sliders move across the corresponding resistance tracks in a plane perpendicular to the plane of the drawing of FIG. 3 when there is a rotation of the movable part about the rotational axis 204 as a consequence of a movement of the element connected to the measuring device shown in FIG. 3. The slider voltages are supplied to the control unit 10 via contacts, connecting lines and insert connections not shown in FIG. 3. The potentiometer arrangement is duplicated on the other side of the rotational axis 204 in the case of a measuring device for detecting gas pedal position and throttle flap position as disclosed in the state of the art discussed above.

The elements of a Hall switch are mounted on the inner side of the fixed housing part 200. In FIG. 3, a permanent magnet 214 is provided on the upper inner side 212 opposite to the Hall element 216 on the lower inner side. In another embodiment, this arrangement can be selected to be reversed. In addition, it is not necessary that the Hall switch and potentiometer lie in the same section plane through the arrangement shown in FIG. 3.

The contactless, wear-free Hall switch can be a Hall switch, for example, Siemens TLE 4903 or Sprague UGS-3019. The necessary electrical connection to the current or voltage supply as well as a return announcement of the switching state to the control unit 10 takes place via the connections 218 shown.

A further essential element of the arrangement of FIG. 3 for realizing a switch function is the element 220 fixedly connected to the movable part 202, the slider carrier. This element 220 is clamped between the movable part 202 and the fixed housing 200 and rotates in correspondence to the movements of the slider carrier about the rotational axis 204. This element projects over the movable part into the space between magnet 214 and Hall element 216 as shown in FIG. 4.

The element 220 is preferably configured as a metal strip which is configured so as to be formed as an arcuate segment in the region of the magnet 214 and Hall element 216 perpendicular to the plane of FIG. 3. Other forms can be selected in other embodiments. It is essential, however, that the element 220 only covers a pregiven portion of the rotational range of the movable part 202 or of the element connected thereto (gas pedal/throttle flap/etcetera).

In other embodiments, the element 220 can comprise other materials shielding magnetic fields.

The switching function is realized with element 220. The switch point, that is the angle at which a change of the switching state takes place, is set, in accordance with the embodiment, by means of the magnitude of the element 220 projecting into the space between magnet 214 and Hall element 216 and/or by means of its position in comparison to the zero point (idle stop of the gas pedal/throttle flap).

Since the elements, magnet 214 and Hall element 216, are mounted on the fixed part of the housing on opposite sides thereof, the Hall element generates in each position of the movable part a signal by means of the magnetic flux through the Hall element generated by the magnet 214. This would mean that the switch formed from 216 and 214 is closed in each position. In order to bring about the switching function, the element 220 (the shielding metal) is dimensioned such that the Hall element 216 is shielded from magnet 214 and its magnetic field for a specific position range of the movable element 202. In this region, the Hall element generates no signal and the switch is deemed to be open.

FIGS. 3 and 4 show the situation in the idle condition of the arrangement. In FIG. 4, a plan view of the arrangement of FIG. 3 is shown. The reference numerals identify the same elements so that a detailed description is unnecessary.

It is understood that the foregoing description is that of the preferred embodiments of the invention and that various changes and modifications may be made thereto without departing from the spirit and scope of the invention as defined in the appended claims.

What is claimed is:

1. An arrangement for detecting a position of a movable element of an internal combustion engine of a motor vehicle, said arrangement comprising:
   a first measuring device for detecting said position and generating a first signal representative of said position;
   a second measuring device for detecting said position and generating a second signal also representative of said position;
   a switching device for generating a third signal likewise representative of said position;
   a microcomputer for receiving said first, second and third signals for generating an output for controlling a power output of said engine from at least said first and second signals; and,
   said microcomputer functioning to compare said first, second and third signals to each other and to detect a fault condition when at least one of said signals lies outside of a pregiven tolerance range when compared to one or both of the other signals.

2. The arrangement of claim 1, wherein the engine includes an accelerator pedal defining said movable element.

3. The arrangement of claim 1, wherein the engine includes a throttle flap defining said movable element.

4. The arrangement of claim 1, said microcomputer also functioning to generate said output on the basis of said signals which lie within said pregiven tolerance range when one of said signals lies outside of said pregiven tolerance range when compared to said two signals.

5. The arrangement of claim 1, wherein said first and second measuring devices are first and second potentiometers, respectively.

6. The arrangement of claim 1, wherein said switching device is a Hall switch.

7. The arrangement of claim 6, further comprising a housing; and, said measuring devices and said Hall switch being mounted in said housing.

8. The arrangement of claim 7, said motor vehicle having an operator-actuated member defining said movable element and a power-determining member for adjusting the power generated by said engine; said Hall switch including: a Hall device fixedly mounted in said housing; a permanent magnet having a magnetic field and being fixedly mounted in said housing adjacent said Hall device; and, shielding means connected to one of said members and being arranged between said Hall device and said permanent magnet for preventing said magnetic field to act on said Hall device in a predetermined range of movement of said one member.

9. The arrangement of claim 8, at least one of said measuring devices having a shaft rotatably mounted in said housing and having a slider rotatable with said shaft; and, said shielding means being a sheet metal element fixedly mounted on said shaft so as to rotate therewith through the same angle as said slider.

10. The arrangement of claim 1, said microcomputer including first means for comparing said first and second signals to each other and for determining a fault when said first and second signals have first and second signal values, respectively, which do not lie in a pregiven tolerance range when compared to each other; and, second means for comparing said signal values of said first signal or said second signal to said third signal and for deriving a fault state therefrom.

11. The arrangement of claim 1, comprising means for initiating an emergency operation wherein the power of said engine is limited when both said first and second signals do not lie in said tolerance range when compared to each other and said first signal or said second signal deviates from said third signal.

* * * * *